United States Patent [19]

Morris et al.

[11] Patent Number: 5,878,429
[45] Date of Patent: Mar. 2, 1999

[54] SYSTEM AND METHOD OF GOVERNING DELIVERY OF FILES FROM OBJECT DATABASES

[75] Inventors: John William Morris, San Diego; Steven Scott Schnetzler, Valley Center, both of Calif.

[73] Assignee: Ipivot, Inc., Poway, Calif.

[21] Appl. No.: 683,724

[22] Filed: Jul. 18, 1996

[51] Int. Cl.[6] .................................................. G06F 17/30
[52] U.S. Cl. .......................................... 707/103; 707/10
[58] Field of Search ...................................... 707/10, 103

[56] References Cited

U.S. PATENT DOCUMENTS

| | | | |
|---|---|---|---|
| 5,280,610 | 1/1994 | Travis, Jr. et al. | 707/103 |
| 5,329,619 | 7/1994 | Page et al. | 395/200.33 |
| 5,341,477 | 8/1994 | Pitkin et al. | 395/200.56 |
| 5,442,791 | 8/1995 | Wrabetz et al. | 395/674 |
| 5,615,363 | 3/1997 | Jenness | 707/103 |
| 5,634,124 | 5/1997 | Khoyi et al. | 707/103 |
| 5,652,880 | 7/1997 | Seagraves | 707/103 |

OTHER PUBLICATIONS

Mullins, The Great Debate, Byte, Apr. 1994.
Streeter "Switches Offer More Bandwidth For Less Money", MacWeek Solutions, Apr. 17, 1995.
Harvest Papers, http://newbruno.cs.colorado.edu/harvest/papers.html#overview, Jun. 21, 1996.
"An Exploration of Dynamic Documents", Netscape Communication Corporation, Jun. 20, 1996.

*Primary Examiner*—Thomas G. Black
*Assistant Examiner*—Greta L. Robinson
*Attorney, Agent, or Firm*—Edward W. Callan

[57] ABSTRACT

A remote information server contains at least one set of object data bases, with each set including a first object data base containing information content components and a separate second object data base containing context information pertaining to linkages between the information content components of the first object data base of the same set of object data bases. Information content object files respectively containing at least one information content component from the first object data base in the remote information server are delivered to respective local information servers when requested or directed and cached in the respective local information servers. The entire second object data base(s) of context information are delivered from the remote information server to, and maintained in, a plurality of broker/servers. A set of the local information servers is coupled to each broker/server. The broker/server responds to receipt of a request from a user terminal for delivery of a selected context information object file containing context information pertaining to the linkages of a selected category of information content components by delivering the selected context information object file to the user terminal from a second object data base maintained in the broker/server. The broker/server responds to receipt of a request from a user terminal for delivery of a selected information content object file containing at least one selected information content component by requesting a selected local information server to deliver to the user terminal the selected information content object file that is cached in the selected local information server.

67 Claims, 6 Drawing Sheets

SYSTEM AND METHOD OF GOVERNING DELIVERY OF FILES FROM OBJECT DATABASES

BACKGROUND OF THE INVENTION

The present invention generally pertains to data processing and is particularly directed to an improvement in governing the delivery of files from object data bases to a user terminal via a network interface.

In the prior art, an object data base includes objects in a format of information content components, context information pertaining to linkages between the information content components and processing instructions for manipulating the information content components and the context information in such a manner as to facilitate efficient retrieval of the information content components and the context information from the object data base. The context information (a) identifies the information content components that are linked, (b) defines the relationship between the linked content components, such as relationships analogous to parent, child, sibling, external or contained, (c) identifies the defined relationship, and (d) identifies the locations in the object data base of the content components having the defined relationship. Accordingly, objects may be organized in an object data base for retrieval in an abstract manner that resembles the way in which the information content components thereof are realized in the real world. An object data base is well suited for complex objects, such as bill-of-materials hierarchies and multimedia BLOBS (binary large objects).

Object data bases contained in prior art information servers may be accessed indirectly or directly by a user terminal through a communication network, such as the Internet or a private communication network, and a file-delivery-governing system that connects the information server to a network interface for the communication network. A prior art system for governing delivery of object files to a user terminal via a network interface from an object data base contained in an information server responds to receipt of a user-terminal request for delivery of a selected object file containing at least one selected information content component and the context information pertaining to the linkages of the selected information content component(s) by providing to the user terminal via the network interface a pointer to the selected object file that enables the user terminal to obtain delivery of the selected object file from the information server via the network interface.

SUMMARY OF THE INVENTION

The present invention provides a system for governing delivery of files from object data bases, comprising first means containing at least one set of object data bases with each set including a first object data base containing information content components and a separate second object data base containing context information pertaining to linkages between the information content components of the first object data base of said set; second means for delivering a selected information content object file containing at least one selected information content component from the first object data base; and third means for delivering a selected context information object file containing context information pertaining to the linkages of a selected category of information content components from the second object data base.

More specifically, in a preferred embodiment, the first means comprises at least one remote information server containing at least one said set of object data bases; the third means comprise a plurality of broker/servers coupled to each remote information server, with each broker/server being adapted (a) for receiving delivery of the second object data base(s) of context information from the remote information server to which the broker/server is coupled, (b) for maintaining the delivered second object data base(s) of context information, and (c) for responding to receipt of a request for delivery of a selected context information object file containing context information pertaining to the linkages of a selected category of information content components by delivering the selected context information object file from a said second object data bases maintained in the broker/server; the second means comprises a plurality of sets of local information servers respectively coupled to the plurality of broker/servers and to the remote information server to which the respective broker/server is coupled, with the local information servers being respectively adapted (d) for receiving delivery of information content object files respectively containing at least one information content component from the first object data base(s) in the remote information server to which the local information server is coupled and (e) for caching the delivered information content object files; and said broker/servers, which are respectively adapted (f) for responding to receipt of a request for delivery of a selected information content object file containing at least one selected information content component by requesting a selected one of the local information servers that are coupled to the recipient broker/server to deliver the selected information content object file; and the local information servers are respectively adapted (g) for responding to said request from the recipient broker/server to deliver the selected information content object file by delivering the selected information content object file from the selected local information server.

The present invention further provides respectively the broker/server, the remote information server, the local information server and a delivery network including at least one broker/server and a set of local information servers included in the system of the present invention and methods related to use of the system of the present invention.

By separating storage and delivery of the context information object files from storage and delivery of the information content object files, the present invention facilitates agile accessibility to the selected context information files and the selected information content files respectively. For example, a relatively small selected context information object file can be readily retrieved and delivered to a user terminal for use in searching for selected information content components without having to also retrieve and/deliver the much larger portion of information content components that are related to the selected context information.

By individually governing the delivery of the context information object files and the information content object files from a remote information server to a specifiable user terminal through a plurality of delivery networks of broker/servers having sets of local information servers respectively coupled thereto, the present invention enables efficient delivery of these object files through delivery networks of relatively small computers such that the number and the respective sizes of the delivery networks may be adapted readily to meet the relative frequency of user requests for delivery of the selected object files.

By providing autonomous redundant capability for delivery of the context information object files and the information content object files from a remote information server through a plurality of delivery networks of broker/servers having sets of local information servers respectively coupled thereto, the present invention reduces the likelihood of an overall system failure.

Additional features of the present invention are described with reference to the detailed description of the preferred embodiments.

DETAILED DESCRIPTION

Figure 1:
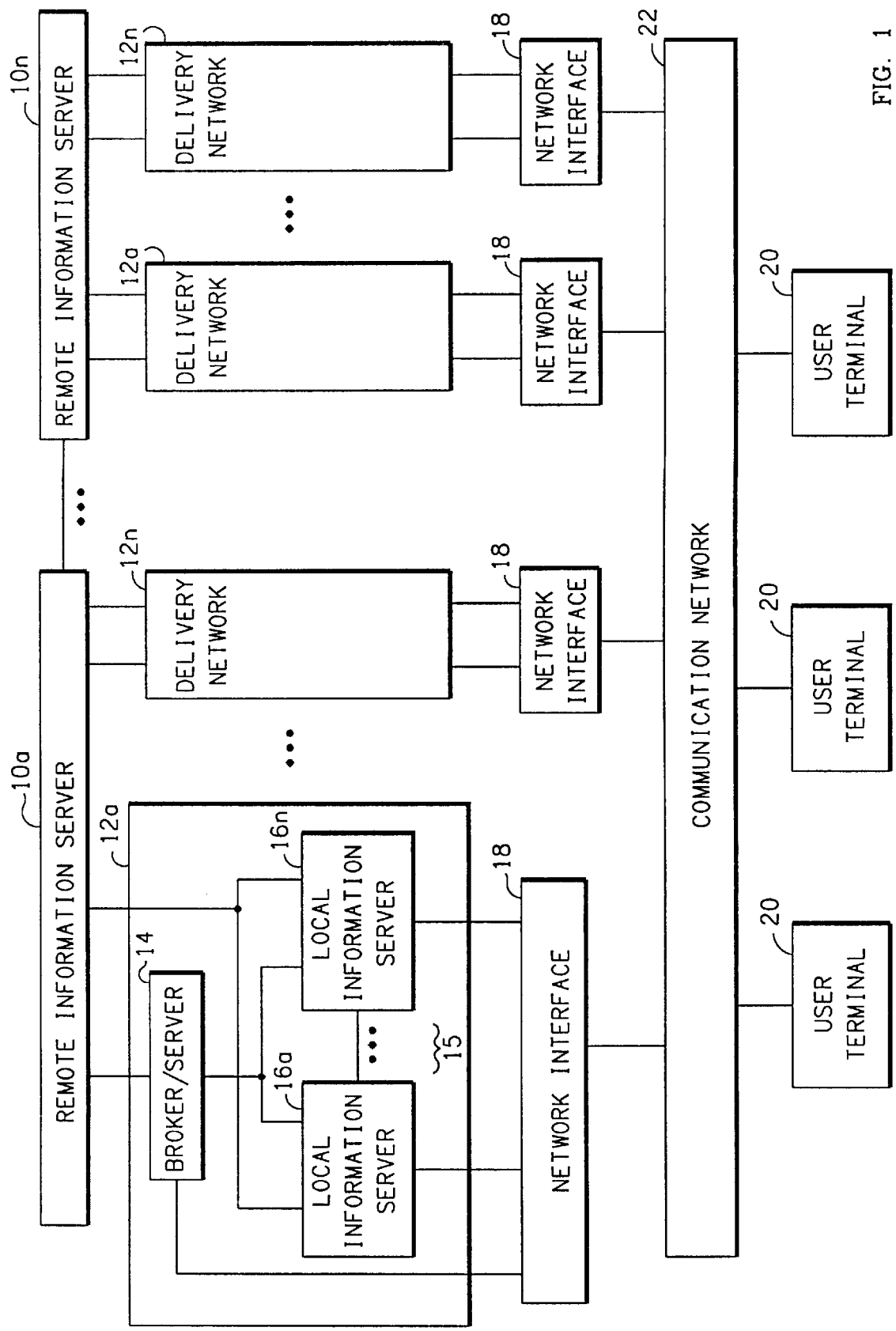
FIG. 1 is a block diagram of a preferred embodiment of a file-delivery-governing system according to the present invention.

Referring to FIG. 1, a preferred embodiment of a file-delivery-governing system according to the present invention includes a plurality of remote information servers 10a, . . . , 10n and a plurality of delivery networks 12a, . . . , 12n coupled to each remote information server 10a, . . . , 10n. Each delivery network 12a, . . . , 12n includes at least one (preferably two or more) broker/servers 14 and a set 15 of local information servers 16a, . . . , 16n respectively coupled to each broker/server 14 and to the remote information server 10, . . . , 10n to which the broker/server(s) 14 is connected. A plurality of network interfaces 18 respectively couple the broker/server(s) 14 and the local information servers 16a, . . . , 16n of the respective delivery networks 12, . . . , 12n to any number of user terminals 20 via a communication network 22, such as the Internet or a private network.

The remote information servers 10a, . . . , 10n are interconnected for communicating object data bases from one another so that common sets of object data bases may be stored in a plurality of the remote information servers 10a, . . . , 10n. Preferably, most of the sets of object data bases stored in one remote information server 10a, . . . , 10n are stored in all of the remote information servers 10a, . . . , 10n, with only those sets of object data bases that are of only local interest being stored in only one of the remote information servers 10a, . . . , 10n. The use of a plurality of remote information servers 10a, . . . , 10n is based upon geographical and/or network topological disbursement considerations.

Figure 2:
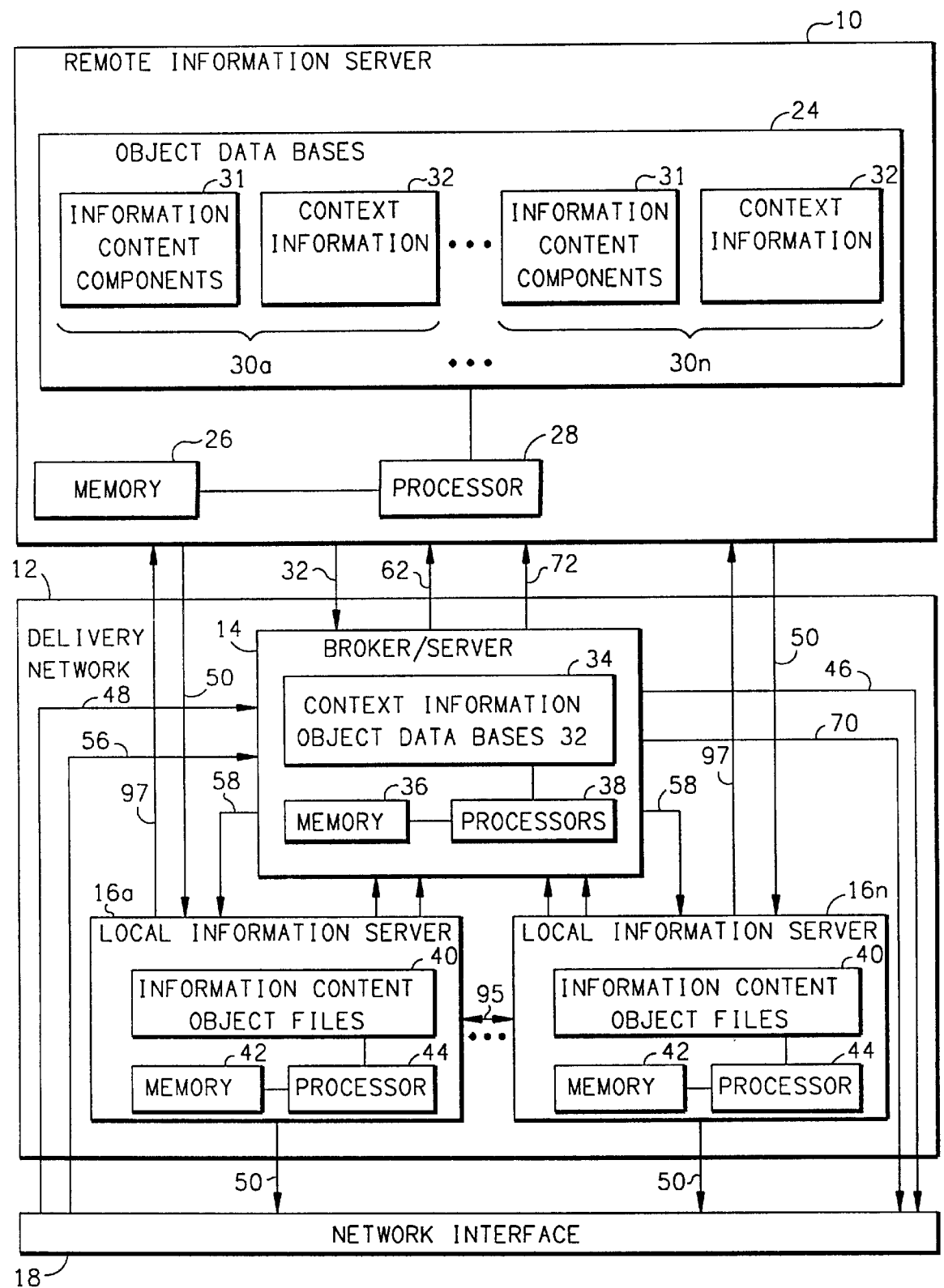
FIG. 2 is a block diagram of a remote information server coupled to a communication network interface by a delivery network that includes a broker/server and a set of local information servers coupled to the broker/server, as included in a preferred embodiment of the system of FIG. 1.

Referring to FIG. 2, each remote information server 10 is embodied in a separate computer and includes an object data base memory device 24, a separate second memory device 26 and a processor 28. Each object data base memory device 24 contains one or more sets 30a, . . . , 30n of object data bases, with each set 30 including a first object data base 31 containing information content components and a separate second object data base 32 containing context information pertaining to linkages between the information content components of the first object data base 31 of the same set 30 of object data bases. The size of the context information in a typical object data base is an order of magnitude less than the typical size of the related information content components, in that the combined context information usually requires a storage capacity in a range of 100 to 400 kilobytes and the related information content components usually require a combined storage capacity in a range of 1 to 75 megabytes.

The object data base memory device 24 is a random access memory device, such as a recording disk, rather than a sequential access memory device. The second memory device 26 is a non-volatile random access memory, such as a recording disk, for use in storing data other than the object data bases, such as data pertaining to the operation of the remote information server 10 for delivering files from the first object data bases 31 and the second object data bases 32. The processor 28 processes the data pertaining to such operation of the remote information server 10 and executes various routines pertaining to delivery of object files from the remote information server 10.

Each broker/server 14 is embodied in a multi-processor computer or in a plurality of computers and includes an object data base random access memory device 34, such as a recording disk, a separate second memory device 36 and a plurality of processors 38. The second memory device 36 is a non-volatile random access memory, such as a recording disk, for use in storing data other than object data bases, such as data pertaining to the operation of the broker/server 14 for controlling the delivery of selected information content object files to and from the local information servers 16a, . . . , 16n connected to the respective broker/server 14. The processors 38 process the data pertaining to such operation of the broker/server 10 and execute various routines pertaining to identification and delivery of context information object files from the broker/server 14 to the user terminal 20 via the network interface 18 and of delivery of selected information content object files to and from the local information servers 16a, . . . , 16n connected to the respective broker/server 14.

Each local information server 16a, . . . , 16n is embodied in a separate autonomous computer, such as an IBM-compatible personal computer or a dedicated single-board computer, and includes an object data base random access memory device 40, such a recording disk, a separate second memory device 42 and a processor 44. The second memory device 42 is a non-volatile random access memory, such as a recording disk, for use in storing data other than object data bases, such as data pertaining to the operation of the local information server 16a, . . . , 16n for controlling the delivery of information content object files to and from the local information server 16a, . . . , 16n. The processor 44 processes the data pertaining to such operation of the local information server 16a, . . . , 16n and executes various routines pertaining to delivery of selected information content object files to and from the local information server 16a, . . . , 16n.

The broker/server 14 receives delivery of the second object data bases 32 of context information from the object data base memory device 24 in the remote information server 10 to which the broker/server 14 is coupled. Such delivery occurs when the system is initialized; and the remote information server 10 causes such a delivery to recur from time to time after the second object data bases 32 of context information in the object data base memory device 24 in remote information server 10 are changed.

The broker/server 14 maintains the most recently delivered second object data bases 32 of context information in the object data base memory device 34. Maintaining the entirely of the relatively small second object data bases 32 of context information in each broker/server 14 from the object data base memory device 24 in the remote information server 10 makes such context information more readily accessible for searches for specific information content components. Such a search is accomplished at a user terminal 20 within a selected context information object file 46 containing context information pertaining to the linkages of a selected category of information content components after such a selected context information object file 46 has been delivered to the user terminal 20 via the network interface 18.

The broker/server 14 responds to receipt from a user terminal 20 via the network interface 18 of a request 48 for delivery to the user terminal 20 via the network interface 18 of a selected context information object file 46 by delivering the selected context information object file 46 to the user terminal 20 via the network interface 18 from the second object data bases 32 maintained in its object data base memory device 34. Upon delivering the selected context information object file 46 to the user terminal 20 via the network interface 18, the broker/server 14 also delivers therewith a browser software program that enables the user terminal 20 to display the context information from the selected context information object file 46.

Each of the local information servers 16a, . . . , 16n is respectively coupled to the remote information server 10 to which the broker/server 14 is coupled by a switched access connection (not shown) and is respectively adapted for receiving delivery of information content object files 50 respectively containing at least one information content component from the first object data bases 31 in the remote information server 10. Each of the local information servers 16a, . . . , 16n is also respectively adapted for caching the delivered information content object files 50 in its object data base memory device 40. Each of the local information servers 16a, . . . , 16n is capable of retaining a plurality of cached information content object files 50 in the object data base memory device 40.

Each local information server 16a, . . . , 16n maintains in its second memory 42 its own record of data 52 identifying the information content object files 50 then cached therein and data 54 indicating various characteristics of the information content object files 50 then cached therein, such as the general subject matter of the information content object files 50. Whenever, an information content object file 50 is cached in or deleted from the object data base memory device 40 of a local information server 16a, . . . , 16n, the respective local information server 16a, 16n . . . , updates the record of the file-identifying data 52 and the file-characteristic-indicating data 54 in its second memory 42 and provides the current file-identifying data 52 and the current file-characteristic-indicating data 54 to the broker/server 14 coupled thereto, and the broker/server 14 records the current file-identifying data 52 and the current file-characteristic-indicating data 54 in its second memory 36.

Figure 3:
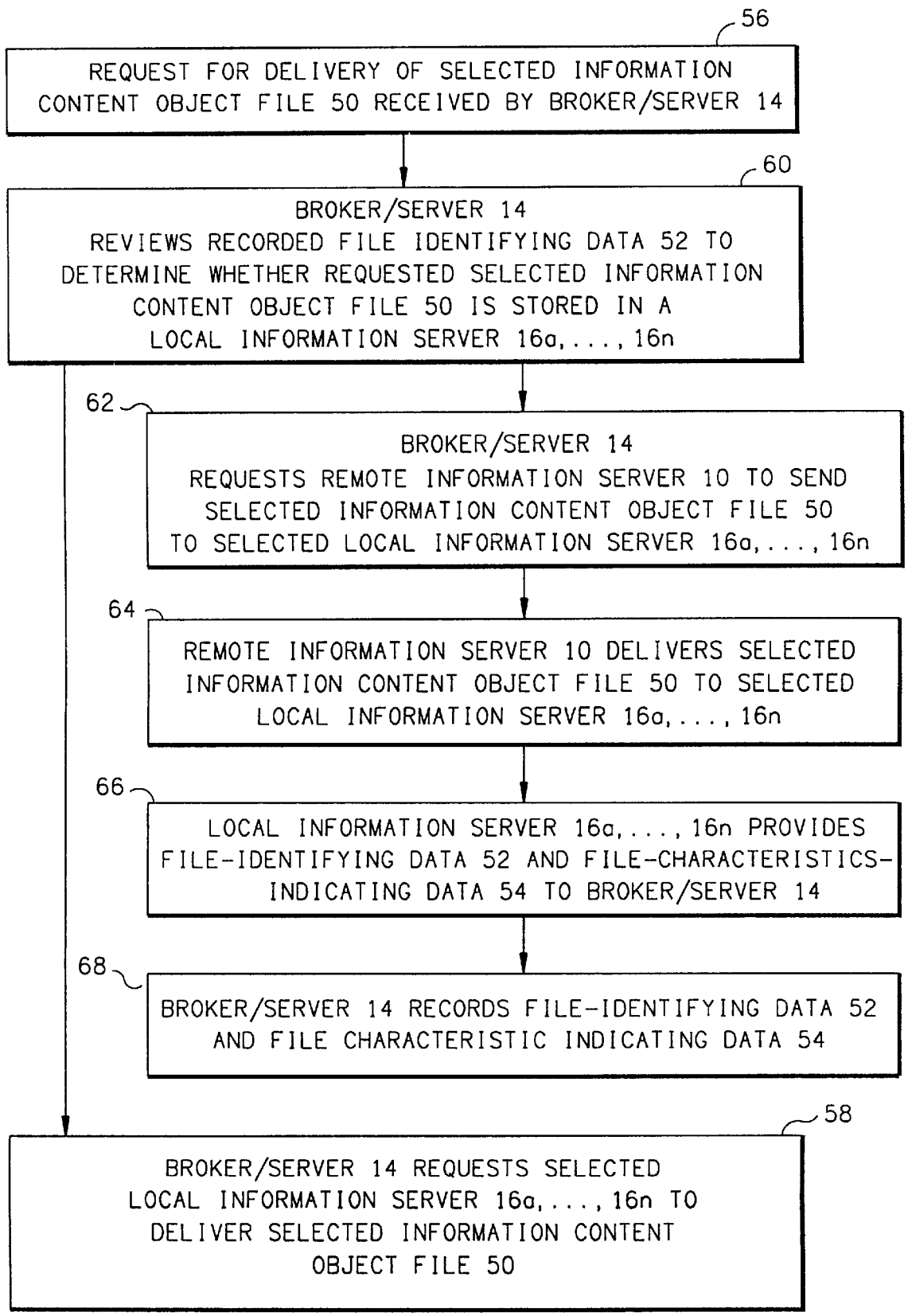
FIG. 3 is a flow diagram for the delivery of a selected information content object file from the remote information server in a "pumped" mode of operation.

Referring to FIGS. 2 and 3, the broker/server 14 responds to receipt of a request 56 from the user terminal 20 for delivery of a selected information content object file 50 containing at least one selected information content component by executing a routine 60 of reviewing the file-identifying data 52 recorded in its second memory 36 to determine whether the requested selected information content object file 50 file has been cached in at least one of the local information servers 16a, . . . , 16n coupled to the broker/server 14, and if so, to identify the local information server(s) 16a, . . . , 16n in which the selected information content object file 50 is presently cached. When it is determined that the requested selected information content object file 50 file is presently cached in one of the local information servers 16a, . . . , 16n, the broker/server 14 sends a request 58 to a selected one of the local information servers 16a, . . . , 16n in which the selected information content object file 50 is presently cached to deliver the selected information content object file 50 to the user terminal 20 via the network interface 18. The request 58 to the local information server 16a, . . . , 16n also identifies a delivery channel of the network interface 18 over which the selected file is to be delivered by the selected local information server 16a, . . . , 16n to the user terminal 22.

When it is determined that the requested selected information content object file 50 file is not presently cached in one of the local information servers 16a, . . . , 16n, the broker/server 14 selects one of the local information servers 16a, . . . , 16n to receive the selected information content object file 50 from the remote information server 10 in accordance with a "pumped" mode of operation. For the pumped mode of operation, the broker/server 14 selects the local information server 16a, . . . , 16n to which the selected information content object file 50 is to be delivered in accordance with the file-characteristic-indicating data 54 recorded in its second memory 36 so as to cause information content object files 50 having a common characteristic to be cached in the same local information server 16a, . . . , 16n.

In accordance with the pumped mode of operation, the broker/server 14 sends a request 62 to the remote information server 10 to the which the broker/server 14 is coupled to deliver the selected information content object file 50 to the selected local information server 16a, . . . , 16n from one of the first object data bases 31 in the remote information server 10. Upon sending the request 62 to the remote information server 10, the broker/server 14 also sends the file delivery request 58 to the selected local information server 16a, . . . , 16n.

The local information server 16a, . . . , 16n that receives the file delivery request 58 responds thereto by delivering the selected information content object file 50 from the object data base memory device 40 of the local information server 16a, . . . , 16n to the user terminal 20 via the identified channel of the network interface 18.

Upon determining that the requested selected information content object file 50 file is presently cached in one of the local information servers 16a, . . . , 16n, the broker/server 14 sends to the user terminal 20 via the network interface 18 a message 70 informing, the user terminal 20 of the impending delivery of the requested selected information content object file 50 together with a short-term security file receipt token for validating the selected local information server 16a, . . . , 16n as the server of the object file 50 to be delivered. If the delivered selected information content object file 50 is encrypted, the message 70 also includes a transmittal security token, such as an encryption key, for use in decrypting the encrypted file. Upon sending the delivery request 62 to the remote information server 10 and the message 70 to the user terminal 20 via the network interface 18, the broker/ server 10, the broker/server 14 records data indicating that the selected information content object file 50 has been delivered to an identified user terminal 20; and from time to time the broker/server 14 transmits such data to one or more other terminals (not shown), where such data is further recorded and processed for the purposes of demographic data compilation and/or of billing for delivery of the selected information content object file 50 to the identified user terminal 20.

Figure 4:
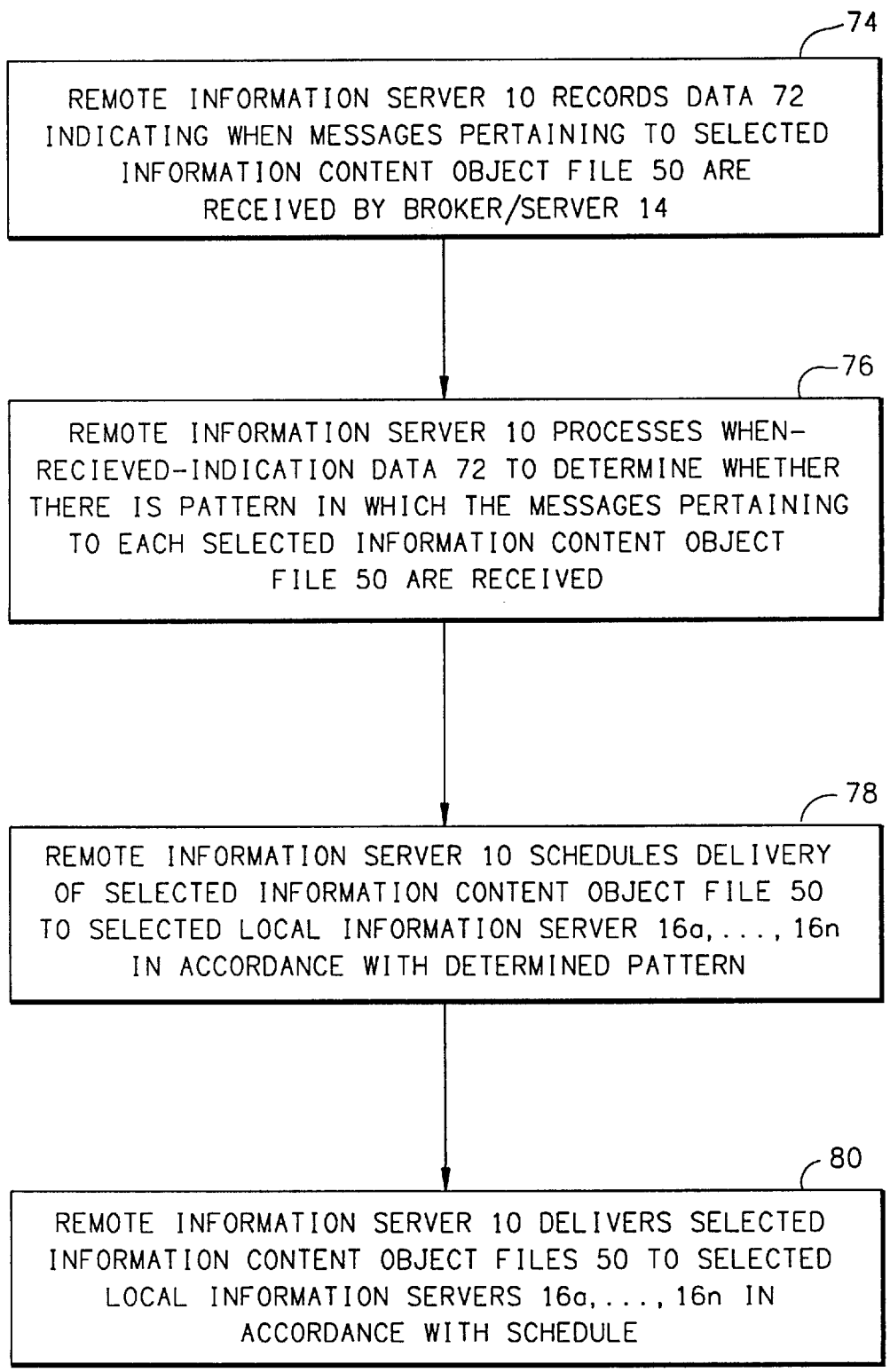
FIG. 4 is a flow diagram for the delivery of a selected information content object file from the remote information server in an "adaptive" mode of operation.

Selected information content object files 50 are also delivered from the remote information server 10 to the local information servers 16a, . . . , 16n in accordance with an "adaptive" mode of operation, which is described with reference to FIGS. 2 and 4. The broker/server 14 provides to the remote information server 10 data 72 indicating when messages pertaining to each selected information content object file 50, such as the delivery requests 48, 56 and other inquires, are received by the broker/server 14; and the remote information server 10 executes a routine 74 of recording the provided when-received-indication data 72 in its second memory 26. Periodically, the remote information server 10 executes a routine 76 of processing the provided when-received-indication data 72 to determine whether there is a pattern in which messages 48, 56 pertaining to any of the selected information content object files 50 are received by the broker/server 14. When it is determined upon periodic re-execution of the routine 76 of processing the when-received-indication data 72 that the previously determined pattern is no longer valid, the pattern may be modified by such re-execution of the data processing routine 76. When it is determined upon such periodic re-execution of the data processing routine 76 that there no longer is a valid pattern in which messages 48, 56 pertaining to a given selected information content object file 50 are received by the broker/server 14, the given selected information content object file 50 is no longer delivered from the remote information server 10 to a selected local information server 16a, . . . , 16n in accordance with the adaptive mode.

When it is determined that there is such a request pattern for a given selected information content object file 50, the remote information server 10 executes a routine 78 of scheduling the delivery of the given selected information content object file 50 to a selected local information server 16a, . . . , 16n so that the given selected information content object file 50 is delivered to the selected local information server 16a, . . . , 16n before such time as it is anticipated that a request for delivery of the given information content object file 50 to the user terminal 20 via the network interface 18 will be received in accordance with such determined pattern. Subsequently, the remote information server 10 executes a routine 80 of delivering the given selected information content object file 50 to the selected local information server 16a, . . . , 16n from one of the first object data bases 31 in the remote information server 10 in accordance with such schedule.

Figure 5:
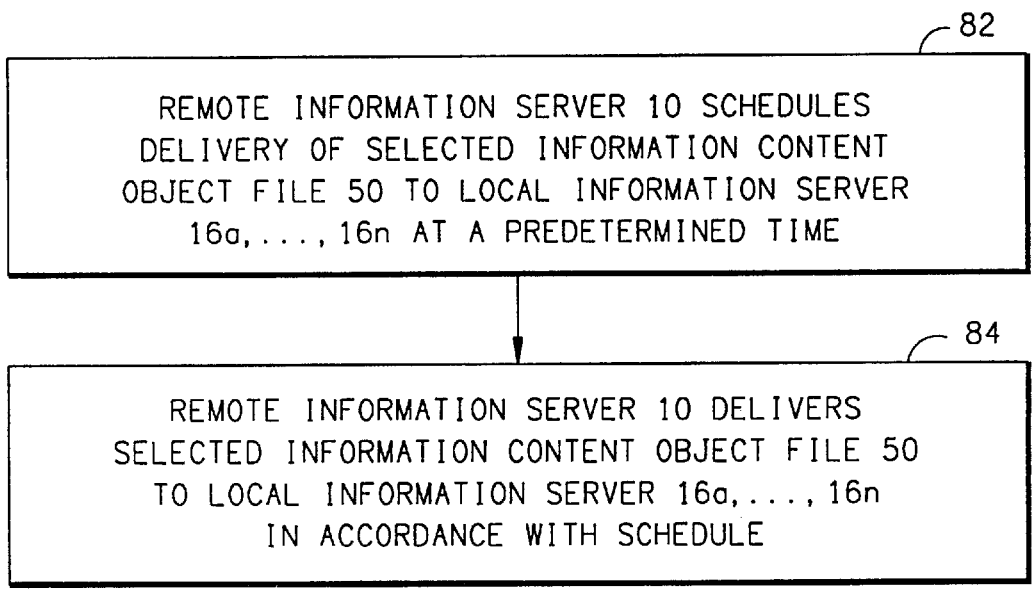
FIG. 5 is a flow diagram for the delivery of a selected information content object file from the remote information server in a "predictive" mode of operation.

Selected information content object files 50 are also delivered from the remote information server 10 to the local information servers 16a, . . . , 16n in accordance with a "predictive" mode of operation, which is described with reference to FIGS. 2 and 5. When it is known that a request 56 for delivery a given selected information content object file 50 will be received at a given time, the remote information server 10 is programmed to execute a routine 82 of scheduling delivery of the given selected information content object file 50 to a selected local information server 16a, . . . , 16n at a predetermined time prior to the given time; and the remote information server 10 subsequently executes a routine 84 of delivering the given selected information content object file 50 to the selected local information server 16a, . . . , 16n from one of the first object data bases 31 in the remote information server 10 in accordance with such schedule.

The file-delivery-governing system of the present invention thus has the versatile capability of being able to deliver selected information content object files 50 to the local information servers 16a, . . . , 16n from the remote information server 10 pursuant to (a) the pumped mode, wherein a first selected information content file 50 is delivered from the remote information server 10 to a selected local information server 16a, . . . , 16n in response to receipt of a request 56 for delivery to the user terminal 20 via the network interface 18 of a selected information content file 50 when the selected information content file 50 is not presently cached in any of the local information servers 16a, . . . , 16n, (b) the adaptive mode, wherein a second selected information content file 50 is delivered from the remote information server 10 to a selected local information server 16a, . . . , 16n in accordance with a schedule determined by processing data 72 indicating when messages 48, 56 pertaining to the second selected information content file 50 are received; and (c) the predictive mode, wherein a third selected information content file 50 is delivered from the remote information server 10 to a selected local information server 16a, . . . , 16n at a predetermined time. The terms "first", "second" and "third" do not indicate sequence. The pumped, adaptive and predictive modes of operation are independent of one another and may overlap and/or be competitive with one another.

Figure 6:
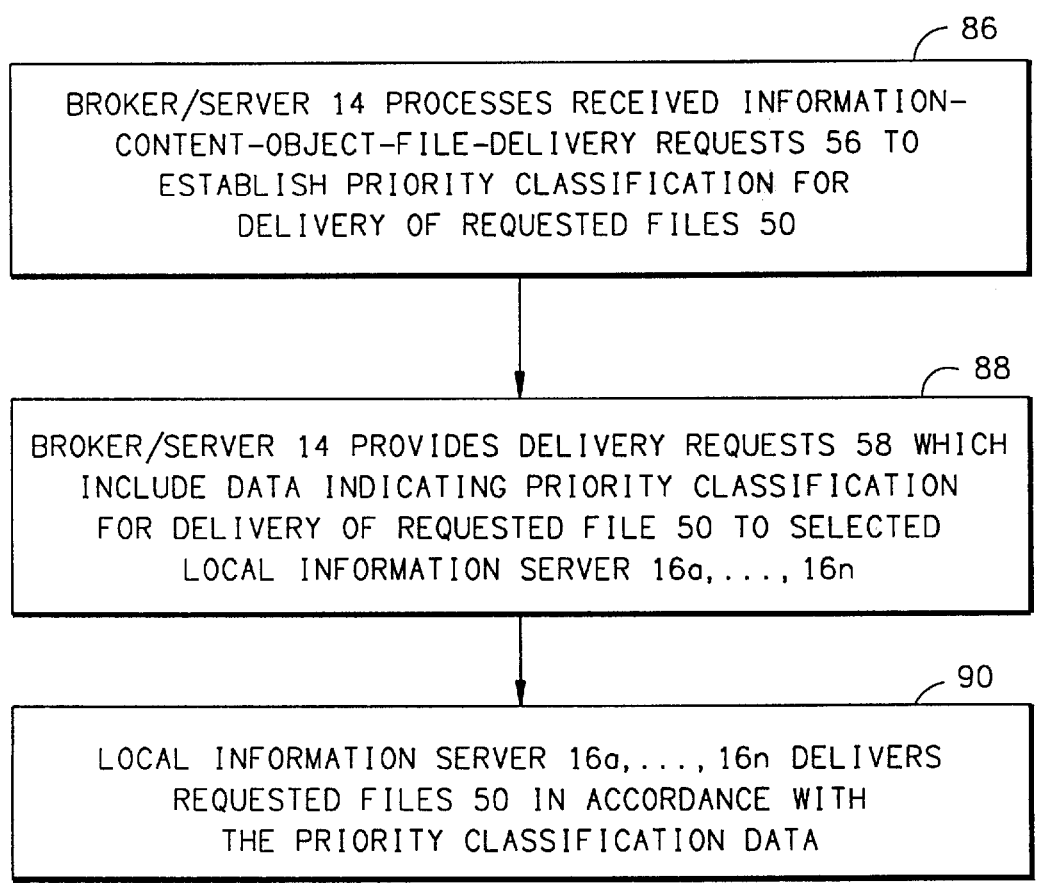
FIG. 6 is a flow diagram for the delivery of selected information content object files from the remote information server in accordance with an established priority.

Referring to FIGS. 2 and 6, the broker/server 14 executes a routine 86 of processing the received information-content-object-file-delivery requests 56 to establish a priority classification for the delivery of the requested information content object files 50. Such classification is based in part upon delivery parameters included within the delivery request 56 received from the user terminal 20. The broker/server 14 executes a routine 88 of providing to the selected local information server 16a, . . . , 16n. Data indicating the priority classification established for delivery of a selected information content object file 50 to a selected local information server 16a, . . . , 16n pursuant to the file delivery request 58. The priority classification data is provided to the selected local information server 16a, . . . , 16n as a part of the file delivery request 58. The local information server 16a, . . . , 16n executes a routine 90 of delivering the selected information content object file 50 to the network interface 18 in accordance with the established priority classification data.

Figure 7:
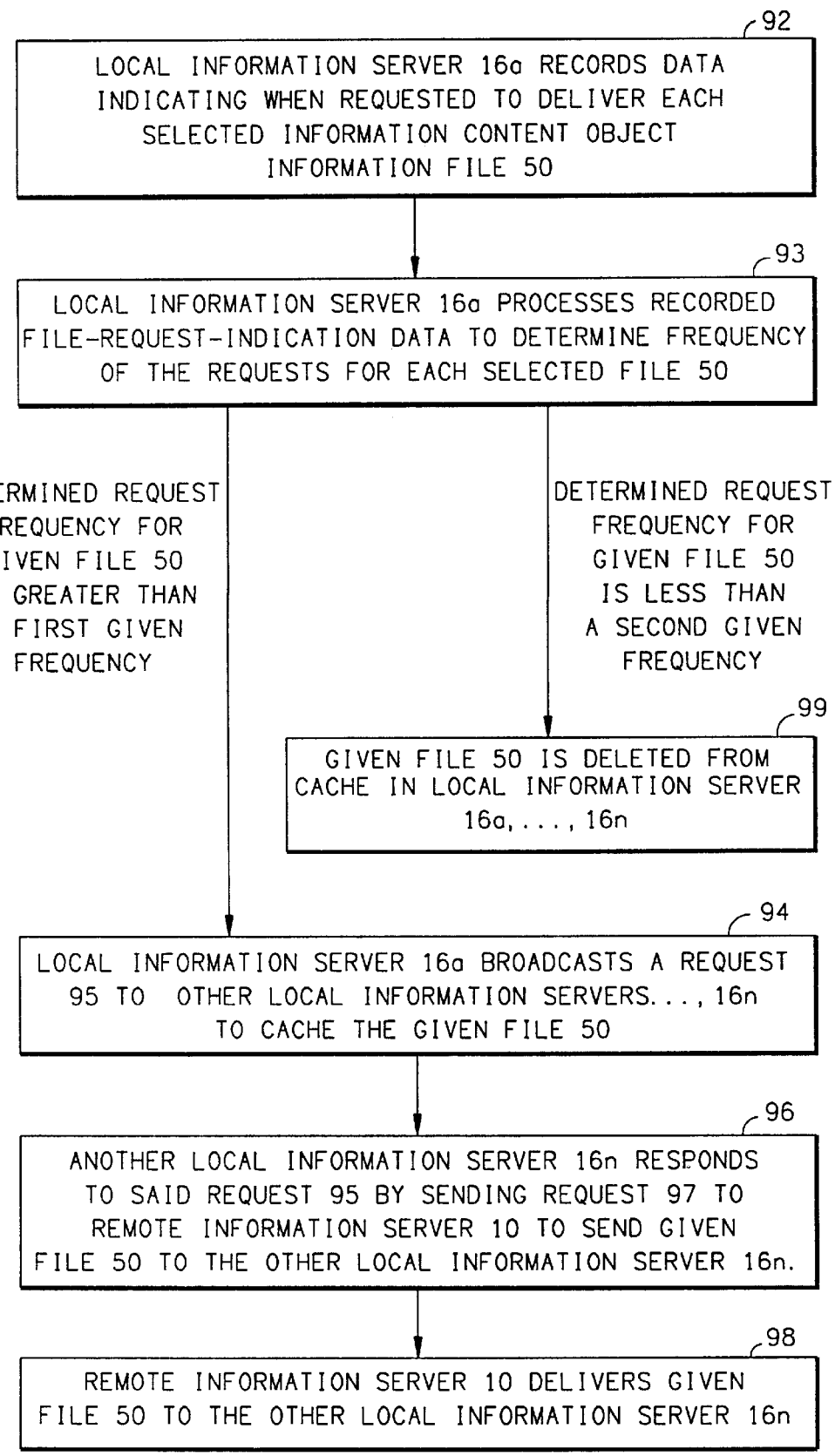
FIG. 7 is a flow diagram for regulating the caching of a selected information content object file within a set of local information servers.

Referring to FIGS. 2 and 7, the local information servers 16a, . . . , 16n of at least one set 15 of local information servers respectively execute a routine 92 of recording internally provided data indicating when the respective local information server 16a, . . . , 16n is requested to deliver each selected information content object file 50 to the user terminal 20 via the network interface. A respective local information server 16a periodically executes a routine 93 of processing the recorded file-delivery-request-indication data to determine the frequency at which the respective local information server 16a is requested to deliver the selected information content object file 50 to the user terminal 20 via the network interface 18.

When it is determined that the frequency at which the respective local information server 16a is requested to deliver a given selected information content object file 50 to the user terminal 20 via the network interface 18 is greater than a first given frequency, the local information server executes a routine 94 of asynchronously broadcasting to the other local information servers 16a, . . . , 16n of the same set 15 of local information servers 16a, . . . , 16n a request 95 that any of the other local information servers . . . , 16n also cache the given selected information content object file 50. The asynchronous mode of communication only minimally loads the local information servers 16a, . . . , 16n inasmuch as no acknowledgment is required to the asynchronous broadcast.

When another local information server 16n receiving the request 95 is not then busy and has the capacity to cache the given selected information content object file 50, the other local information server 16n responds to the cache request 95 by executing a routine 96 of providing to the remote information server 10 a further request 97 that the remote information server 10 deliver the given selected information content object file 50 to the other local information server 16n. The remote information server 10 responds to the further request 97 by executing a routine 98 of delivering the given selected information content object file 50 to the other local information server 16n.

By caching selected information content object files 50 in more than one local information server 16a, . . . , 16n of a set 15 of information servers in accordance with the frequency at which given local information servers 16a, . . . , 16n are requested to deliver respective selected information content object files 50 to one or more user terminals 20 via the network interface 18, the file-delivery-governing system of the present invention is able to dynamically adjust its capacity for making the respective selected information content object files 50 readily available for access in accordance with user demand.

Still referring to FIG. 7, when it is determined pursuant to the execution of the above-described processing routine 93 that the frequency at which the respective local information server 16a, . . . , 16n is requested to deliver a given selected information content object file 50 to the user terminal 20 via the network interface 18 is less than a second given frequency, the local information server 16a, . . . , 16n executes a routine 99 of deleting the given selected information content object file 50 from the local information server 16a, . . . , 16n.

Each local information server 16a, . . . , 16n is further adapted for deleting information content object files 50 from its object data base memory device 40 in accordance with other internally stored criteria in order to achieve a capacity for caching new selected information content object files 50 delivered thereto, such as by deleting such files 50 in accordance with a first-in-first-out criteria. The local information server 16a, . . . , 16n also deletes selected information content object files 50 from its object data base memory device 40 pursuant to directives embedded in the respective selected information content object files 50 that are delivered to the local information server 16a, . . . , 16n.

In various alternative embodiments (not shown), (a) records of the file-identifying data 52 and the file-characteristic-indicating data 54 for each of the respective local information servers 16a, . . . , 16n is provided by and stored in the remote information server 10, with updated data 52, 54 being provided whenever the remote information server 10 sends a selected information content object file 50 to a respective selected local information server 16a, . . . , 16n ; (b) selection of a given local information server 16a, . . . , 16n for receipt of a selected information content object file 50 delivered from the remote information server is made by the remote information server 10 in accordance with file-characteristic-indicating-data 54 stored in the remote information server 10; (c) delivery by the remote information server 10 of the selected information content object files 50 to the local information servers 16a, . . . , 16n is scheduled by the broker/server 14; and/or (e) the broker/server 14 monitors the frequency of the requests 58 to each local information server 16a, . . . , 16n to deliver each selected information content object file 50 and causes a given selected information content object files 50 to be cached in a second local information server 16a, . . . , 16n when the frequency of such requests is greater than a given frequency.

The file-delivery-governing system of the present invention is well suited for simultaneously delivering a large number of relatively large (greater than one Megabyte) information content object files to various user terminals in a high bandwidth environment in a manner that is transparent to a user of the system.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A system for governing delivery of files from object databases, comprising:

first means containing at least one set of object databases with each set including a first object database containing information content components and a separate second object database containing context information pertaining to linkages between the information content components of the first object database of said set, wherein the first means comprises a remote information server containing at least one said set of object databases;

second means for delivering a selected information content object file containing at least one selected information content component from the first object database, the second means comprising a plurality of local information servers coupled to the remote information server, and respectively adapted for (a) receiving delivery of information content object files respectively containing at least one information content component from the first object database(s) in the remote information server, (b) caching the delivered information content object files, and (c) responding to receipt of a request for delivery of a selected information content object file containing at least one selected information content component by delivering the selected information content object file from a selected one of the local information servers;

third means for delivering a selected context information object file containing context information pertaining to the linkages of a selected category of information content components from the second object database; and fourth means for delivering the selected information content object file to the selected local information server from said first object database in the remote information server.

2. The system as defined in claim 1, wherein the fourth means is operable upon receipt of the request for delivery of the selected information content object file when the selected information content object file is not cached in any of the local information servers.

3. The system as defined in claim 2, further comprising:

fifth means for recording data indicating characteristics of the information content object files cached in the respective local information servers; and sixth means for selecting the local information server to which said selected information content object file is delivered from said first object database in the remote information server in accordance with the recorded file-characteristic-indicating data so as to cause information content object files having a common characteristic to be cached in the same local information server.

4. The system as defined in claim 1, further comprising:

fifth means for providing data indicating when messages pertaining to the selected information content object file are received from a user terminal; and sixth means for processing the provided when-received-indication data to determine a pattern in which said messages pertaining to the selected information content object file are received from a user terminal, wherein the fourth means for delivering is in accordance with said determined pattern.

5. The system as defined in claim 1, wherein the fourth means for delivering delivers the selected information content object file to the selected local information server from said first object database in the remote information server at a predetermined time.

6. The system as defined in claim 1, further comprising:

fifth means for providing data indicating when messages pertaining to a second said selected information content object file are received from a user terminal;

sixth means for processing the provided when-received-indication data to determine a pattern in which said messages pertaining to the second said selected information content object file are received from a user terminal;

seventh means for delivering the second said selected information content object file to the selected local information server from said first object database in the remote information server in accordance with said determined pattern; and eighth means for delivering a third said selected information content object file to the selected local information server from said first object database in the remote information server at a predetermined time, wherein the fourth means is operable upon receipt of the request for delivery of the selected information content object file when the selected information content object file is not cached in any of the local information servers.

7. The system as defined in claim 1 further comprising:

fifth means for providing data indicating when messages pertaining to a second said selected information content object file are received from a user terminal;

sixth means for processing the provided when-received-indication data to determine a pattern in which said messages pertaining to the second said selected information content object file are received from a user terminal; and seventh means for delivering the second said selected information content object file to the selected local information server from said first object database in the remote information server in accordance with said determined pattern, wherein the fourth means is operable upon receipt of the request for delivery of the selected information content object file when the selected information content object file is not cached in any of the local information servers.

8. The system as defined in claim 1, further comprising fifth means for delivering another selected information content object file to the selected local information server from said first object database in the remote information server at a predetermined time, wherein the fourth means is operable upon receipt of the request for delivery of the selected information content object file when the selected information content object file is not cached in any of the local information servers.

9. The system as defined in claim 1, further comprising:

fifth means for providing data indicating when messages pertaining to a first said selected information content object file are received from a user terminal;

sixth means for processing the provided when-received-indication data to determine a pattern in which said messages pertaining to the first said selected information content object file are received from a user terminal;

seventh means for delivering the first said selected information content object file to the selected local information server from said first object database in the remote information server in accordance with said determined pattern, wherein the fourth means for delivering delivers a second said selected information content object file to the selected local information server from said first object database in the remote information server at a predetermined time.

10. The system as defined in claim 1, further comprising:

fifth means for recording data identifying the information content object files cached in the respective local information servers; and sixth means for selecting the local information server from which the requested selected information content object file is delivered in accordance with the recorded file-identifying data.

11. The system as defined in claim 1, further comprising:

fifth means for recording data indicating when requests for delivery of selected information content object files are received by the selected local information server;

sixth means for processing the recorded file-request-indication data to determine the frequency at which requests for delivery of individual selected information content object files are received by the selected local information server; and seventh means for causing a given said selected information content object file to also be delivered to and cached in another local information server when it is determined that the frequency at which requests for delivery of the given selected information content object file are received by the selected local information server is greater than a given frequency.

12. The system as defined in claim 1, further comprising:
fifth means for recording data indicating when requests for delivery of selected information content object files are received by the selected local information server;
sixth means for processing the recorded file-request-indication data to determine the frequency at which requests for delivery of the individual selected information content object file are received by the selected local information server; and
seventh means for causing a given said selected information content object file to be deleted from a respective said local information server when it is determined that the frequency at which requests for delivery of the given selected information content object file are received by the selected local information server is less than a given frequency.

13. The system as defined in claim 1, further comprising;
fifth means for processing information-content-object-file-delivery requests received from user terminal(s) to establish a priority classification for delivery of the requested selected information content object files to the user terminal(s),
wherein the local information servers are respectively adapted for (d) delivering the selected information content object files in accordance with the established priority classification.

14. The system as defined in claim 1, wherein the first means comprise a plurality of said remote information servers, and wherein at least one common said set of object databases is contained in each of said plurality of remote information servers.

15. The system as defined in claim 14, wherein each remote information server is embodied in a separate computer.

16. The system as defined in claim 15, wherein each local information server is embodied in a separate computer.

17. The system as defined in claim 1, wherein each local information server is embodied in a separate computer.

18. The system as defined in claim 17, wherein each remote information server is embodied in a separate computer.

19. A system for governing delivery of files from object databases, comprising:
first means containing at least one set of object databases with each set including a first object database containing information content components and a separate second object database containing context information pertaining to linkages between the information content components of the first object database of said set;
second means for delivering a selected information content object file containing at least one selected information content component from the first object database; and
third means for delivering a selected context information object file containing context information pertaining to the linkages of a selected category of information content components from the second object database,
wherein the first means comprises at least one remote information server containing at least one said set of object databases, and
wherein the second means comprises:
a plurality of broker/servers coupled to each remote information server; and
a plurality of sets of local information servers respectively coupled to the plurality of broker/servers and to the remote information server to which the respective broker/server is coupled, with the local information servers being respectively adapted for (a) receiving delivery of information content object files respectively containing at least one information content component from the first object database(s) in the remote information server to which the local information server is coupled and (b) caching the delivered information content object files, and
wherein said broker/servers are respectively adapted for (c) responding to receipt of a request for delivery of a selected information content object file containing at least one selected information content component by requesting a selected one of the local information servers that are coupled to the recipient broker/server to deliver the selected information content object file, and
wherein the local information servers are respectively adapted for (d) responding to said request from the recipient broker/server to deliver the selected information content object file by delivering the selected information content object file, and
wherein the remote information server coupled to the selected local information server is adapted for (e) delivering the selected information content object file to the selected local information server from said first object database in the coupled remote information server.

20. The system as defined in claim 19, wherein said broker/servers are respectively adapted for responding to receipt of the request for delivery of the selected information content object file, when the selected information content object file is not cached in any of the local information servers coupled to said recipient broker/server, by requesting the remote information server to the which said recipient broker/server is coupled to deliver the selected information content object file to the selected local information server; and
wherein the remote information server to which said recipient broker/server is coupled is adapted for responding to said request from said recipient broker/server to deliver the selected information content object file by delivering the selected information content object file to the selected local information server from said first object database in said coupled remote information server.

21. The system as defined in claim 20, wherein the local information servers are respectively adapted for providing to the broker/server coupled thereto data indicating characteristics of the information content object files cached in the respective local information servers, and
wherein said broker/servers are respectively adapted for (f) recording the file-characteristic-indicating data provided by the local information servers to which said recipient broker/server is coupled, and (g) selecting the local information server to which said selected information content object file is delivered from said first object database in the remote information server coupled to said recipient broker/server in accordance with the recorded file-characteristic-indicating data so as to cause information content object files having a common characteristic to be cached in the same local information server.

22. The system as defined in claim 19, wherein said broker/servers are respectively adapted for providing to the remote information server to which said recipient broker/server is coupled data indicating when messages pertaining to the selected information content object file are received by said recipient broker/server, and wherein the remote information server to which said recipient broker/server and the selected local information server are coupled is adapted for (f) processing the provided when-received-indication data to determine a pattern in which said messages pertaining to the selected information content object file are received by said recipient broker/server, and (g) delivering the selected information content object file to the selected local information server from said first object database in the remote information server in accordance with said determined pattern.

23. The system as defined in claim 19, wherein the remote information server coupled to the selected local information server is adapted for delivering the selected information content object file to the selected local information server from said first object database in the coupled remote information server at a predetermined time.

24. The system as defined in claim 19, wherein said broker/servers are respectively adapted for responding to receipt of the request for delivery of a first said selected information content object file when the selected information content object file is not cached in any of the local information servers coupled to said recipient broker/server by requesting the remote information server to the which said recipient broker/server is coupled to deliver the first said selected information content object file to the selected local information server;

wherein the remote information server to the which said recipient broker/server is coupled is adapted for (f) responding to said request from said recipient broker/server to deliver the first said selected information content object file by delivering the first said selected information content object file to the selected local information server from the first object database(s) in said coupled remote information server;

wherein said broker/servers are respectively adapted for (g) providing to the remote information server to which said recipient broker/server is coupled data indicating when messages pertaining to a second said selected information content object file are received by said recipient broker/server;

wherein the remote information server to which said recipient broker/server and the selected local information server are coupled is adapted for (h) processing the provided when-received-indication data to determine a pattern in which said messages pertaining to the second said selected information content object file are received by said recipient broker/server, and (i) delivering the second said selected information content object file to the selected local information server from said first object database in the remote information server coupled to the selected local information server in accordance with said determined pattern; and wherein the remote information server coupled to the selected local information server is adapted for (j) delivering a third said selected information content object file to the selected local information server from said first object database in the coupled remote information server at a predetermined time.

25. The system as defined in claim 19, wherein said broker/servers are respectively adapted for responding to receipt of the request for delivery of a first said selected information content object file when the selected information content object file is not cached in any of the local information servers coupled to said recipient broker/server by requesting the remote information server to the which said recipient broker/server is coupled to deliver the first said selected information content object file to the selected local information server;

wherein the remote information server to the which said recipient broker/server is coupled is adapted for (f) responding to said request from said recipient broker/server to deliver the first said selected information content object file by delivering the first said selected information content object file to the selected local information server from the first object database(s) in said coupled remote information server;

wherein said broker/servers are respectively adapted for (g) providing to the remote information server to which said recipient broker/server is coupled data indicating when messages pertaining to a second said selected information content object file are received by said recipient broker/server; and wherein the remote information server to which said recipient broker/server and the selected local information server are coupled is adapted for (h) processing the provided when-received-indication data to determine a pattern in which said messages pertaining to the second said selected information content object file are received by said recipient broker/server, and (i) delivering the second said selected information content object file to the selected local information server from said first object database in the remote information server coupled to the selected local information server in accordance with said determined pattern.

26. The system according to claim 19, wherein said broker/servers are respectively adapted for responding to receipt of the request for delivery of a first said selected information content object file when the selected information content object file is not cached in any of the local information servers coupled to said recipient broker/server by requesting the remote information server to the which said recipient broker/server is coupled to deliver the first said selected information content object file to the selected local information server;

wherein the remote information server to the which said recipient broker/server is coupled is adapted for (f) responding to said request from said recipient broker/server to deliver the first said selected information content object file by delivering the first said selected information content object file to the selected local information server from the first object database(s) in said coupled remote information server; and wherein the remote information server coupled to the selected local information server is adapted for (g) delivering a second said selected information content object file to the selected local information server from said first object database in the coupled remote information server at a predetermined time.

27. The system as defined in claim 19, wherein said broker/servers are respectively adapted for providing to the remote information server to which said recipient broker/server is coupled data indicating when messages pertaining to a first said selected information content object file are received by said recipient broker/server;

wherein the remote information server to which said recipient broker/server and the selected local information server are coupled is adapted for (f) processing the provided when-received-indication data to determine a pattern in which said messages pertaining to the first said selected information content object file are received by said recipient broker/server, and (g) delivering the first said selected information content object file to the selected local information server from said first object database in the remote information server coupled to the selected local information server in accordance with said determined pattern; and wherein the remote information server coupled to the selected local information server is adapted for (h) delivering a second said selected information content object file to the selected local information server from said first object database in the coupled remote information server at a predetermined time.

28. The system as defined in claim 19, wherein the local information servers are respectively adapted for providing to the broker/server coupled thereto data identifying the information content object files cached in the respective local information server; and wherein said broker/servers are respectively adapted for (f) recording the file-identifying data provided by the local information servers to which the broker/server is coupled, and (g) selecting the local information server from which the requested selected information content object file is delivered in accordance with the stored file-identifying data.

29. The system as defined in claim 19, wherein the local information servers of at least one said set of local information servers are respectively adapted for (f) recording data indicating when the respective local information server is requested to deliver the selected information content object file, (g) processing the recorded file-delivery-request-indication data to determine the frequency at which the respective local information server is requested to deliver the selected information content object file, (h) communicating to another local information server of said at least one said set of local information servers a request that said other local information server also cache the selected information content object file when it is determined that the frequency at which the respective local information server is requested to deliver the selected information content object file is greater than a given frequency, and (i) responding as said other local information server to said cache request by providing to the remote information server to which the local information server is coupled a further request that said coupled remote information server deliver the selected information content object file to said other local information server; and wherein said coupled remote information server is adapted for (j) responding to said further request by delivering the selected information content object file to said other local information server.

30. The system as defined in claim 19, wherein the local information servers of at least one said set of local information servers are respectively adapted for (f) recording data indicating when the respective local information server is requested to deliver the selected information content object file, (g) processing the recorded file-delivery-request-indication data to determine the frequency at which the respective local information server is requested to deliver the selected information content object file, and (h) deleting the selected information content object file from the respective local information server when it is determined that the frequency at which the local information server is requested to deliver the selected information content object file is less than a given frequency.

31. The system as defined in claim 19, wherein at least one of the broker/servers is adapted for (f) processing information-content-object-file-delivery requests received from user terminal(s) to establish a priority classification for delivery of the requested selected information content object files to the user terminal(s); and (g) providing said established priority classification to the selected local information server(s); and wherein the local information servers coupled to the at least one broker/server are respectively adapted for (h) delivering the selected information content object files in accordance with the established priority classification.

32. A broker/server for use in a system for governing delivery of files from object databases, wherein said system includes a remote information server containing at least one set of object databases, with each set including a first object database containing information content components and a separate second object database containing context information pertaining to linkages between the information content components of the first object database(s) of said set; and a set of local information servers respectively coupled to the remote information server and adapted for receiving delivery of information content object files respectively containing at least one information content component from the first object database(s) in the remote information server and for caching the delivered information content object files, the broker/server comprising:

means for receiving delivery of the second object database(s) of context information from the remote information server;

means for maintaining the delivered second object database(s) of context information;

means for responding to receipt of a request for delivery of a selected context information object file containing context information pertaining to the linkages of a selected category of information content components by delivering the selected context information object file from said second object database maintained in the broker/server;

means for responding to receipt of a request for delivery of a selected information content object file containing at least one selected information content component by requesting a selected one of the local information servers to deliver the selected information content object file;

means for responding to receipt of the request for delivery of the selected information content object file, when the selected information content object file is not cached in any of the local information servers, by requesting the remote information server to deliver the selected information content object file to a selected one of the local information servers;

means for recording characteristics of the information content object files cached in the respective local information servers; and means for selecting the local information server to which said selected information content object file is delivered from said first object database in the remote information server in accordance with the recorded file-characteristic-indicating data so as to cause information content object files having a common characteristic to be cached in the same local information server.

33. A broker/server for use in a system for governing delivery of files from object databases, wherein said system includes a remote information server containing at least one set of object databases, with each set including a first object database containing information content components and a separate second object database containing context information pertaining to linkages between the information content components of the first object database(s) of said set; and a set of local information servers respectively coupled to the remote information server and adapted for receiving delivery of information content object files respectively containing at least one information content component from the first object database(s) in the remote information server and for caching the delivered information content object files, the broker/server comprising:

> means for receiving delivery of the second object database(s) of context information from the remote information server;
>
> means for maintaining the delivered second object database(s) of context information;
>
> means for responding to receipt of a request for delivery of a selected context information object file containing context information pertaining to the linkages of a selected category of information content components by delivering the selected context information object file from said second object database maintained in the broker/server;
>
> means for responding to receipt of a request for delivery of a selected information content object file containing at least one selected information content component by requesting a selected one of the local information servers to deliver the selected information content object file;
>
> means for recording data identifying the information content object files cached in the respective local information server; and
>
> means for selecting the local information server from which the requested selected information content object file is delivered in accordance with the stored file-identifying data.

34. A broker/server for use in a system for governing delivery of files from object databases, wherein said system includes a remote information server containing at least one set of object databases, with each set including a first object database containing information content components and a separate second object database containing context information pertaining to linkages between the information content components of the first object database(s) of said set; and a set of local information servers respectively coupled to the remote information server and adapted for receiving delivery of information content object files respectively containing at least one information content component from the first object database(s) in the remote information server and for caching the delivered information content object files, the broker/server comprising:

> means for receiving delivery of the second object database(s) of context information from the remote information server;
>
> means for maintaining the delivered second object database(s) of context information;
>
> means for responding to receipt of a request for delivery of a selected context information object file containing context information pertaining to the linkages of a selected category of information content components by delivering the selected context information object file from said second object database maintained in the broker/server;
>
> means for responding to receipt of a request for delivery of a selected information content object file containing at least one selected information content component by requesting a selected one of the local information servers to deliver the selected information content object file;
>
> means for processing information-content-object-file-delivery requests received from user terminal(s) to establish a priority classification for delivery of the requested selected information content object files to the user terminal(s); and
>
> means for providing said established priority classification to the selected local information server(s).

35. A remote information server for use in a system for governing delivery of files from object databases, wherein the system includes a set of local information servers and a broker/server that is responsive to requests for delivery of selected files, the remote information server comprising:

> memory means containing at least one set of object databases, with each set including a first object database containing information content components and a separate second object database containing context information pertaining to linkages between the information content components of the first object database of said set;
>
> means for delivering information content object files respectively containing at least one information content component to from the first object database(s) to the respective selected local information servers;
>
> means for delivering the second object database(s) to the broker/server;
>
> means for responding to a request from the broker/server to deliver a selected information content object file containing at least one selected information content component to a selected one of the local information servers by delivering the selected information content object file to the selected local information server from said first object database; and
>
> means for delivering the selected information content object file to the selected local information server from said first object database.

36. The remote information server as defined in claim 35, further comprising:

> means for processing data indicating when messages pertaining to the selected information content object file are received to determine a pattern in which said messages pertaining to the selected information content object file are received, wherein the means for delivering the selected information content object file delivers the selected information content object file to the selected local information server from said first object database in accordance with said determined pattern.

37. The remote information server according to claim 35, wherein the means for delivering the selected information content object file delivers the selected information content object file to the selected local information server from said first object database at a predetermined time.

38. The remote information server according to claim 35, further comprising:

> means for processing data indicating when messages pertaining to a first said selected information content object file are received to determine a pattern in which said messages pertaining to the first said selected information content object file are received by said recipient broker/server; and
>
> means for delivering the first said selected information content object file to the selected local information server from said first object database in accordance with said determined pattern; and
>
> means for delivering a second said selected information content object file to from said first object database to the selected local information server at a predetermined time.

39. A local information server for use in a system for governing delivery of files from object databases, wherein said system includes a remote information server containing at least one set of object databases, with each set including a first object database containing information content components and a separate second object database containing context information pertaining to linkages between the information content components of the first object database of said set; and a broker/server that is responsive to requests for delivery of selected files, the local information server comprising:

means for receiving from the remote information server delivery of only information content object files respectively containing at least one information content component from the first object database and for caching the delivered information content object files;

means for responding to a request from the broker/server to deliver a selected information content object file containing at least one selected information content component by delivering the selected information content object file; and means for providing data to the broker/server.

40. The local information server as defined in claim 39, wherein the data provided by the means for providing indicates characteristics of the information content object files cached in the local information server.

41. The local information server as defined in claim 39, wherein the data provided by the means for providing identifies the information content object files cached in the local information server.

42. The local information server as defined in claim 39, further comprising means for delivering a selected information content object file in accordance with an established priority classification.

43. The local information server as defined in claim 39, further comprising:

means for recording data indicating when the local information server is requested to deliver the selected information content object file;

means for processing the recorded file-delivery-request-indication data to determine the frequency at which the local information server is requested to deliver the selected information content object file;

means for communicating to another local information server a request that said other local information server also cache the selected information content object file when it is determined that the frequency at which the local information server is requested to deliver the selected information content object file is greater than a given frequency; and means for responding as said other local information server to said cache request by providing to the remote information server a request that the remote information server deliver the selected information content object file to said other local information server.

44. The local information server as defined in claim 39, further comprising:

means for recording data indicating when the local information server is requested to deliver the selected information content object file;

means for processing the recorded file-delivery-request-indication data to determine the frequency at which the local information server is requested to deliver the selected information content object file; and means for deleting the selected information content object file from the local information server when it is determined that the frequency at which the local information server is requested to deliver the selected information content object file is less than a given frequency.

45. A method of governing delivery of files from a remote information server that contains a set of object databases that includes a first object database containing information content components and a separate second object database containing context information pertaining to linkages between the information content components of the first object database of said set, the method comprising the steps of:

(a) delivering an information content object file containing at least one information content component from the first object database in the remote information server to a selected local information server included in a set of local information servers;

(b) caching the delivered information content object file in a selected local information server;

(c) delivering a selected context information object file containing context information pertaining to the linkages of a selected category of information content components from the second object database; and (d) responding to a request from a user terminal for delivery of a selected information content object file containing at least one selected information content component by delivering the selected information content object file from the selected local information server, wherein step (a) comprises the step of:

(e) delivering the selected information content object file to the selected local information server from the first object database in the remote information server.

46. The method as defined in claim 45, wherein when upon receipt of the request for delivery of the selected information content object file, the selected information content object file is not cached in any of the local information servers, step (a) comprises the step of:

responding to said request by delivering the selected information content object file to the selected local information server from the first object database in the remote information server.

47. The method as defined in claim 46, further comprising the steps of:

(f) recording data indicating characteristics of the information content object files cached in the respective local information servers; and (g) selecting the local information server to which said selected information content object file is delivered from the first object database in the remote information server in accordance with the recorded file-characteristic-indicating data so as to cause information content object files having a common characteristic to be cached in the same local information server.

48. The method as defined in claim 45, further comprising the steps of:

(f) providing data indicating when messages pertaining to the selected information content object file are received from a user terminal; and (g) processing the provided when-received-indication data to determine a pattern in which said messages pertaining to the selected information content object file are received from a user terminal;

wherein step (a) comprises the step of:

(h) delivering the selected information server from the file selected local information server from the first object database in the remote information server in accordance with said determined pattern.

49. The method as defined in claim 45, wherein step (a) comprises the step of:

delivering the selected information content object file to the selected local information server from the first object database in the remote information server at a predetermined time.

50. The method as defined in claim 45, further comprising the steps of:

(f) recording data identifying the information content object files cached in the respective local information servers; and (g) selecting the local information server from which the requested selected information content object file is delivered in accordance with the recorded file-identifying data.

51. The method as defined in claim 45, further comprising the steps of:

(f) recording data indicating when requests for delivery of selected information content object files are received by the selected local information server; and (g) processing the recorded file-request-indication data to determine the frequency at which requests for delivery of individual selected information content object files are received by the selected local information server; wherein step (a) comprises the step of:

(h) delivering a given said selected information content object file to another local information server when it is determined that the frequency at which requests for delivery of the given selected information content object file are received by the selected local information server is greater than a given frequency.

52. The method as defined in claim 45, further comprising the steps of:

(f) recording data indicating when requests for delivery of selected information content object files are received by the selected local information server;

(g) processing the recorded file-request-indication data to determine the frequency at which requests for delivery of the individual selected information content object file are received by the selected local information server; and (h) causing a given said selected information content object file to be deleted from the selected local information server when it is determined that the frequency at which requests for delivery of the given selected information content object file are received by the selected local information server is less than a given frequency.

53. The method as defined in claim 45, further comprising the steps of:

(f) processing information-content-object-file-delivery requests received from user terminal(s) to establish a priority classification for delivery of the requested selected information content object file to the user terminal(s);

wherein step (d) comprises the step of:

(g) delivering the selected information content object file in accordance with the established priority classification.

54. A method of governing delivery of files from a remote information server that contains a set of object databases that includes a first object database containing information content components and a separate second object database containing context information pertaining to linkages between the information content components of the first object database of said set, the method comprising the steps of:

(a) delivering information content object files respectively containing at least one information content component from the first object database in the remote information server to respective local information servers of a set of local information servers;

(b) caching the delivered information content object files in the respective local information servers;

(c) delivering the second object database(s) of context information to a broker/server that is coupled to the set of local information servers;

(d) maintaining the delivered second object database(s) of context information in the broker/server;

(e) responding to receipt by the broker/server of a request for delivery of a selected context information object file containing context information pertaining to the linkages of a selected category of information content components by delivering the selected context information object file from said second object database maintained in the broker/server; and (f) responding to receipt by the broker/server of a request for delivery of a selected information content object file containing at least one selected information content component by delivering the selected information content object file from a selected said local information server, wherein step (a) comprises the step of:

(g) delivering said selected information content object file to the selected local information server from the first object database in the remote information server.

55. The method as defined in claim 54, further comprising the step of:

(h) responding to said receipt by the broker/server of the request for delivery of the selected information content object file, when the selected information content object file is not cached in any of the local information servers, by further requesting the remote information server to deliver the selected information content object file to the selected local information server;

wherein step (a) comprises the step of:

delivering the selected information content object file to the selected local information server from the first object database in the remote information server in response to said further request.

56. The method as defined in claim 55, further comprising the steps of:

(j) providing to the broker/server data indicating characteristics of the information content object files cached in the respective local information servers;

(k) recording the file-characteristic-indicating data provided by the local information servers; and (l) selecting the local information server to which said selected information content object file is delivered from the first object database in the remote information server in accordance with the recorded file-characteristic-indicating data so as to cause information content object files having a common characteristic to be cached in the same local information server.

57. The method as defined in claim 54, further comprising the steps of:

(h) providing to the remote information server data indicating when messages pertaining to the selected information content object file are received by the broker/server; and (i) processing the provided when-received-indication data to determine a pattern in which said messages pertaining to the selected information content object file are received by the broker/server;

wherein step (a) comprises the step of:

delivering the selected information content object file to the selected local information server from the first object database in the remote information server in accordance with said determined pattern.

58. The method as defined in claim 54, wherein step (a) comprises the step of:

delivering said selected information content object file to the selected local information server from the first object database in the remote information server at a predetermined time.

59. The method as defined in claim 54, further comprising the steps of:

(h) providing to the broker/server data identifying the information content object files cached in the respective local information servers;

(i) recording the file-identifying data provided by the local information servers; and (j) selecting the local information server from which the requested selected information content object file is delivered in accordance with the stored file-identifying data.

60. The method as defined in claim 54, further comprising the steps of:

(h) recording data indicating when a respective said local information server is requested to deliver the selected information content object file;

(i) processing the recorded file-delivery-request-indication data to determine the frequency at which the respective local information server is requested to deliver the selected information content object file;

(j) communicating to another local information server of said set of local information servers a request that said other local information server also cache the selected information content object file when it is determined that the frequency at which the respective local information server is requested to deliver the selected information content object file is greater than a given frequency;

(k) responding as said other local information server to said cache request by providing to the remote information server a further request that the remote information server deliver the selected information content object file to said other local information server; and (l) responding to said further request by delivering the selected information content object file to said other local information server.

61. The method as defined in claim 54, further comprising the steps of:

(h) recording data indicating when a respective said local information server is requested to deliver the selected information content object file;

(i) processing the recorded file-delivery-request-indication data to determine the frequency at which the respective local information server is requested to deliver the selected information content object file;

(j) deleting the selected information content object file from the respective local information server when it is determined that the frequency at which the respective local information server is requested to deliver the selected information content object file is less than a given frequency.

62. The method as defined in claim 54, further comprising the steps of:

(h) processing information-content-object-file-delivery requests received from user terminal(s) to establish a priority classification for said delivery of said requested information content object files to the user terminals; and (i) providing said established priority classification to the local information server;

wherein step (f) comprises the step of:

(j) delivering the selected information content object file in accordance with the established priority classification.

63. A method of governing delivery of files from object databases to a user terminal, comprising the steps of:

(a) maintaining in a remote information server at least one set of object databases, with each set including a first object database containing information content components and a separate second object database containing context information pertaining to linkages between the information content components of the first object database of said set;

(b) delivering information content object files respectively containing at least one information content component from the first object database in the remote information server to respective local information servers of a set of local information servers;

(c) caching the delivered information content object files in the respective local information servers;

(d) delivering the second object database(s) of context information from the remote information server to a broker/server that is coupled to the set of local information servers;

(e) maintaining the delivered second object database(s) of context information in the broker/server;

(f) responding to receipt by the broker/server of a request from a user terminal for delivery of a selected context information object file containing context information pertaining to the linkages of a selected category of information content components by delivering the selected context information object file to the user terminal from said second object database maintained in the broker/server;

(g) responding to receipt by the broker/server of a request from a user terminal for delivery of a selected information content object file containing at least one selected information content component by delivering the selected information content object file to the user terminal from a selected said local information server; and (h) delivering said selected information content object file to the selected local information server from the first object database in the remote information server.

64. The method as defined in claim 63, further comprising the steps of:

(i) responding to said receipt by the broker/server of the request for delivery to the user terminal of the selected information content object file, when the selected information content object file is not cached in any of the local information servers, by further requesting the remote information server to deliver the selected information content object file to the selected local information server; and (j) responding to said further request to deliver the selected information content object file by delivering the selected information content object file to the selected local information server from the first object database in the remote information server.

65. The method as defined in claim 63, further comprising the steps of:
(i) providing to the remote information server data indicating when messages pertaining to the selected information content object file are received from a user terminal by the broker/server;
(j) processing the provided when-received-indication data to determine a pattern in which messages pertaining to the selected information content object file are received from a user terminal by the broker/server; and
(k) delivering the selected information content object file to the selected local information server from the first object database in the remote information server in accordance with said determined pattern.

66. The method as defined in claim 63, further comprising the step of:
(i) delivering said selected information content object file to the selected local information server from the first object database in the remote information server at a predetermined time.

67. In a local information server for use in a system for governing delivery of files from object databases, wherein said system includes a remote information server containing at least one set of object databases, with each set including a first object database containing information content components and a separate second object database containing context information pertaining to linkages between the information content components of the first object database of said set; and a broker/server that is responsive to requests for delivery of selected files, a method comprising the steps of:

receiving from the remote information server delivery of only information content object files respectively containing at least one information content component from the first object database and for caching the delivered information content object files;

responding to a request from the broker/server to deliver a selected information content object file containing at least one selected information content component by delivering the selected information content object file; and providing data to the broker/server.

* * * * *